(12) United States Patent
Chang et al.

(10) Patent No.: US 8,078,189 B2
(45) Date of Patent: Dec. 13, 2011

(54) SYSTEM AND METHOD FOR PROVIDING LOCATION BASED SERVICES OVER A NETWORK

(75) Inventors: Steve Chang, San Jose, CA (US); Ashutosh Pande, San Jose, CA (US); Lionel Jacques Garin, Palo Alto, CA (US); Kanwar Chadha, Los Gatos, CA (US); Leon Kuo-Liang Peng, Mountain View, CA (US); Gengsheng Zhang, Cupertino, CA (US); Nicolas Patrick Vantalon, Nice (FR); Gregory Turetzky, San Jose, CA (US)

(73) Assignee: Sirf Technology, Inc., San Jose, CA (US)

( * ) Notice: Subject to any disclaimer, the term of this patent is extended or adjusted under 35 U.S.C. 154(b) by 1405 days.

(21) Appl. No.: 11/089,455

(22) Filed: Mar. 24, 2005

(65) Prior Publication Data
US 2005/0227709 A1    Oct. 13, 2005

Related U.S. Application Data

(63) Continuation-in-part of application No. 10/885,507, filed on Jul. 3, 2004, which is a continuation-in-part
(Continued)

(51) Int. Cl.
*H04W 24/00* (2009.01)
(52) U.S. Cl. ............... 455/456.1; 455/414.2; 372/357.2; 372/357.22; 372/358; 701/213

(58) Field of Classification Search ............... 455/414.2, 455/456.3, 456.1; 701/213
See application file for complete search history.

(56) References Cited

U.S. PATENT DOCUMENTS
4,426,712 A    1/1984    Gorski-Popiel
(Continued)

FOREIGN PATENT DOCUMENTS
CN    1589059    3/2005
(Continued)

OTHER PUBLICATIONS

Soliman et al., gps One: A hybrid position location system, 2000 IEEE, pp. 334-335.
(Continued)

*Primary Examiner* — Nimesh Patel
(74) *Attorney, Agent, or Firm* — Pillsbury Winthrop Shaw Pittman LLP (57) ABSTRACT

In a method for providing location-based information over a network, a plurality of GPS reference data sets, corresponding to a plurality of respective local areas, are acquired at intervals such that each GPS reference data set is updated on a continuous basis. A plurality of aiding data sets are generated at intervals based on the respective GPS data sets, whereby each aiding data set is updated on a continuous basis. The generated aiding data sets are stored at intervals on a data-storing network server, whereby updated aiding data sets are available on a continuous basis for access by a requesting entity via communication with the data-storing network server.

34 Claims, 3 Drawing Sheets

Related U.S. Application Data of application No. PCT/US03/16308, filed on May 22, 2003, which is a continuation-in-part of application No. 10/155,614, filed on May 22, 2002, now Pat. No. 6,684,158, which is a continuation-in-part of application No. 09/795,871, filed on Feb. 28, 2001, now Pat. No. 6,427,120, said application No. 10/885,507 is a continuation-in-part of application No. 10/385,198, filed on Mar. 10, 2003, now Pat. No. 6,915,208, which is a continuation of application No. 10/127,229, filed on Apr. 19, 2002, now Pat. No. 6,542,823, which is a continuation of application No. 09/795,871, filed on Feb. 28, 2001, now Pat. No. 6,427,120, said application No. 10/885,507 is a continuation-in-part of application No. 10/194,627, filed on Jul. 12, 2002, which is a continuation of application No. 10/068,751, filed on Feb. 5, 2002, now Pat. No. 6,519,466, which is a continuation of application No. 09/781,068, filed on Feb. 8, 2001, now Pat. No. 6,389,291.

(60) Provisional application No. 60/225,076, filed on Aug. 14, 2000.

(56) References Cited

U.S. PATENT DOCUMENTS

| | | |
|---|---|---|
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |
| 4,998,111 A | 3/1991 | Ma et al. |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,177,490 A | 1/1993 | Ando et al. |
| 5,202,829 A | 4/1993 | Geier |
| 5,223,844 A | 6/1993 | Mansell et al. |
| 5,225,842 A | 7/1993 | Brown et al. |
| 5,257,195 A | 10/1993 | Hirata |
| 5,293,170 A | 3/1994 | Lorenz et al. |
| 5,311,195 A | 5/1994 | Mathis et al. |
| 5,323,164 A | 6/1994 | Endo |
| 5,343,209 A | 8/1994 | Sennott et al. |
| 5,345,244 A | 9/1994 | Gildea et al. |
| 5,347,284 A | 9/1994 | Volpi et al. |
| 5,347,536 A | 9/1994 | Meehan |
| 5,365,450 A | 11/1994 | Schuchman et al. |
| 5,379,224 A | 1/1995 | Brown et al. |
| 5,402,347 A | 3/1995 | McBurney et al. |
| 5,402,441 A | 3/1995 | Washizu et al. |
| 5,416,712 A | 5/1995 | Geier et al. |
| 5,420,593 A | 5/1995 | Niles |
| 5,422,813 A | 6/1995 | Schuchman et al. |
| 5,440,313 A | 8/1995 | Osterdock et al. |
| 5,450,344 A | 9/1995 | Woo et al. |
| 5,504,684 A | 4/1996 | Lau et al. |
| 5,506,587 A | 4/1996 | Lans |
| 5,535,278 A | 7/1996 | Cahn et al. |
| 5,535,728 A | 7/1996 | Cahn et al. |
| 5,546,445 A | 8/1996 | Dennison et al. |
| 5,587,715 A | 12/1996 | Lewis |
| 5,592,173 A | 1/1997 | Lau et al. |
| 5,594,425 A | 1/1997 | Ladner et al. |
| 5,625,668 A | 4/1997 | Loomis et al. |
| 5,663,734 A | 9/1997 | Krasner |
| 5,663,735 A | 9/1997 | Eshenbach |
| 5,666,330 A | 9/1997 | Zampetti |
| 5,701,328 A | 12/1997 | Schuchman et al. |
| 5,724,660 A | 3/1998 | Kausner et al. |
| 5,726,893 A | 3/1998 | Schuchman et al. |
| 5,739,786 A | 4/1998 | Greenspan et al. |
| 5,757,786 A | 5/1998 | Joo |
| 5,764,184 A | 6/1998 | Hatch et al. |
| 5,781,156 A | 7/1998 | Krasner |
| 5,786,789 A | 7/1998 | Janky |
| 5,812,087 A | 9/1998 | Krasner |
| 5,825,327 A | 10/1998 | Krasner |
| 5,828,694 A | 10/1998 | Schipper |
| 5,831,574 A | 11/1998 | Krasner |
| 5,841,396 A | 11/1998 | Krasner |
| 5,845,203 A | 12/1998 | LaDue |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | LaDue |
| 5,903,654 A | 5/1999 | Milton et al. |
| 5,907,578 A | 5/1999 | Pon et al. |
| 5,907,809 A | 5/1999 | Molnar et al. |
| 5,917,444 A | 6/1999 | Loomis et al. |
| 5,920,283 A | 7/1999 | Shaheen et al. |
| 5,923,703 A | 7/1999 | Pon et al. |
| 5,926,131 A | 7/1999 | Sakumoto et al. |
| 5,936,572 A | 8/1999 | Loomis et al. |
| 5,940,027 A | 8/1999 | Forseth et al. |
| 5,943,363 A | 8/1999 | Hanson et al. |
| 5,945,944 A | 8/1999 | Krasner |
| 5,963,582 A | 10/1999 | Stansell, Jr. |
| 5,963,851 A | 10/1999 | Blanco et al. |
| 5,966,403 A | 10/1999 | Pon |
| 5,977,909 A | 11/1999 | Harrison et al. |
| 5,982,324 A | 11/1999 | Watters et al. |
| 5,987,016 A | 11/1999 | He |
| 5,999,124 A | 12/1999 | Sheynblat |
| 6,002,362 A | 12/1999 | Gudat |
| 6,002,363 A | 12/1999 | Krasner |
| 6,009,551 A | 12/1999 | Sheynblat |
| 6,016,119 A | 1/2000 | Krasner |
| 6,040,798 A | 3/2000 | Kinal et al. |
| 6,041,222 A | 3/2000 | Horton et al. |
| 6,047,017 A | 4/2000 | Cahn et al. |
| 6,052,081 A | 4/2000 | Krasner |
| 6,058,338 A | 5/2000 | Agashe et al. |
| 6,061,018 A | 5/2000 | Sheynblat |
| 6,064,336 A | 5/2000 | Krasner |
| 6,081,229 A | 6/2000 | Soliman et al. |
| 6,085,090 A | 7/2000 | Yee et al. |
| 6,097,974 A | 8/2000 | Camp, Jr. et al. |
| 6,104,338 A | 8/2000 | Krasner |
| 6,104,340 A | 8/2000 | Krasner |
| 6,104,712 A | 8/2000 | Robert et al. |
| 6,107,960 A | 8/2000 | Krasner |
| 6,111,540 A | 8/2000 | Krasner |
| 6,111,541 A | 8/2000 | Karmel |
| 6,122,506 A | 9/2000 | Lau et al. |
| 6,131,067 A | 10/2000 | Girerd et al. |
| 6,133,871 A | 10/2000 | Krasner |
| 6,133,873 A | 10/2000 | Krasner |
| 6,133,874 A | 10/2000 | Krasner |
| 6,105,980 A | 11/2000 | Krasner |
| 6,150,980 A | 11/2000 | Krasner |
| 6,172,640 B1 | 1/2001 | Durst et al. |
| 6,178,195 B1 | 1/2001 | Durboraw, III et al. |
| 6,185,427 B1 | 2/2001 | Krasner et al. |
| 6,188,351 B1 | 2/2001 | Bloebaum |
| 6,208,290 B1 | 3/2001 | Krasner |
| 6,208,291 B1 | 3/2001 | Krasner |
| 6,211,817 B1 | 4/2001 | Eschenbach |
| 6,211,819 B1 | 4/2001 | King et al. |
| 6,215,441 B1 | 4/2001 | Moeglein |
| 6,215,442 B1 | 4/2001 | Sheynblat |
| 6,222,483 B1 | 4/2001 | Twitchell et al. |
| 6,222,484 B1 | 4/2001 | Seiple et al. |

| | | | | | | |
|---|---|---|---|---|---|---|
| 6,225,944 | B1 | 5/2001 | Hayes | 7,010,270 B1 | 3/2006 | Thomas et al. |
| 6,236,354 | B1 | 5/2001 | Krasner | 7,091,904 B2 | 8/2006 | Vantalon et al. |
| 6,236,365 | B1 | 5/2001 | LeBlanc et al. | 7,107,064 B2 | 9/2006 | Ito |
| 6,239,742 | B1 | 5/2001 | Krasner | 7,154,436 B1 | 12/2006 | Chadha |
| 6,249,245 | B1 * | 6/2001 | Watters et al. ............ 342/357.1 | 2001/0012771 A1 | 8/2001 | Ruiz |
| 6,252,543 | B1 | 6/2001 | Camp | 2002/0019698 A1 | 2/2002 | Vilppula et al. |
| 6,259,399 | B1 | 7/2001 | Krasner | 2002/0064209 A1 | 5/2002 | Turetzky et al. |
| 6,263,280 | B1 | 7/2001 | Stingone, Jr. | 2002/0072854 A1 | 6/2002 | Fuchs et al. |
| 6,272,430 | B1 | 8/2001 | Krasner | 2002/0080063 A1 | 6/2002 | Bloebaum et al. |
| 6,289,041 | B1 | 9/2001 | Krasner | 2002/0082774 A1 | 6/2002 | Bloebaum |
| 6,295,024 | B1 | 9/2001 | King et al. | 2002/0107030 A1 | 8/2002 | Syrjarinne |
| 6,307,504 | B1 | 10/2001 | Sheynblat | 2002/0142783 A1 | 10/2002 | Yoldi et al. |
| 6,313,786 | B1 | 11/2001 | Sheynblat et al. | 2002/0145560 A1 | 10/2002 | Tsujimoto et al. |
| 6,314,308 | B1 | 11/2001 | Sheynblat | 2002/0186165 A1 | 12/2002 | Eschenbach |
| 6,327,473 | B1 | 12/2001 | Soliman et al. | 2003/0016170 A1 | 1/2003 | Jandrell |
| 6,343,290 | B1 | 1/2002 | Cossins et al. | 2003/0069694 A1 | 4/2003 | Fuchs et al. |
| 6,347,228 | B1 | 2/2002 | Ludden et al. | 2003/0104818 A1 | 6/2003 | Kotzin |
| 6,353,412 | B1 | 3/2002 | Soliman | 2003/0112176 A1 | 6/2003 | Vayanos et al. |
| 6,377,209 | B1 | 4/2002 | Krasner | 2003/0112178 A1 | 6/2003 | Bajikar |
| 6,389,291 | B1 | 5/2002 | Pande et al. | 2003/0125044 A1 | 7/2003 | Deloach et al. |
| 6,400,314 | B1 | 6/2002 | Krasner | 2003/0176204 A1 | 9/2003 | Abraham |
| 6,405,132 | B1 | 6/2002 | Breed et al. | 2003/0201931 A1 | 10/2003 | Durst et al. |
| 6,408,196 | B2 | 6/2002 | Sheynblat | 2003/0212487 A1 | 11/2003 | Dooley et al. |
| 6,411,254 | B1 | 6/2002 | Moeglein et al. | 2004/0130484 A1 | 7/2004 | Krasner |
| 6,411,811 | B1 | 6/2002 | Kingdon et al. | 2004/0162084 A1 | 8/2004 | Wang |
| 6,411,892 | B1 | 6/2002 | Van Diggelen | 2004/0254717 A1 | 12/2004 | Sugahara et al. |
| 6,414,987 | B1 | 7/2002 | Pon | 2004/0263386 A1 | 12/2004 | King et al. |
| 6,417,801 | B1 | 7/2002 | Van Diggelen | 2005/0186968 A1 | 8/2005 | Durst et al. |
| 6,421,002 | B2 | 7/2002 | Krasner | 2006/0038719 A1 | 2/2006 | Pande et al. |
| 6,427,120 | B1 | 7/2002 | Garin et al. | 2006/0181452 A1 | 8/2006 | King et al. |
| 6,429,809 | B1 | 8/2002 | Vayanos et al. | 2007/0063875 A1 * | 3/2007 | Hoffberg .................. 340/995.1 |
| 6,429,814 | B1 | 8/2002 | Van Diggelen et al. | 2008/0005275 A1 * | 1/2008 | Overton et al. ............... 709/218 |
| 6,429,815 | B1 | 8/2002 | Soliman | 2008/0055154 A1 * | 3/2008 | Martucci et al. ........... 342/357.1 |
| 6,433,731 | B1 | 8/2002 | Sheynblat | 2008/0167049 A1 * | 7/2008 | Karr et al. .................. 455/456.2 |
| 6,433,733 | B2 | 8/2002 | Syrarinne et al. | | | |
| 6,433,739 | B1 | 8/2002 | Soliman | | FOREIGN PATENT DOCUMENTS | |
| 6,453,237 | B1 | 9/2002 | Fuchs et al. | EP | 0511741 | 11/1992 |
| 6,456,234 | B1 | 9/2002 | Johnson | EP | 1 092 987 | 4/2001 |
| 6,462,708 | B1 | 10/2002 | Tsujimoto et al. | EP | 1 427 236 A | 6/2004 |
| 6,466,612 | B2 | 10/2002 | Kohli et al. | EP | 1 452 886 A | 9/2004 |
| 6,473,030 | B1 | 10/2002 | McBurney et al. | EP | 1452886 | 9/2004 |
| 6,477,363 | B1 | 11/2002 | Ayoub et al. | GB | 2115195 | 1/1983 |
| 6,480,145 | B1 | 11/2002 | Hasegawa | GB | 2 335 554 A | 3/1998 |
| 6,484,097 | B2 | 11/2002 | Fuchs et al. | JP | 58-105632 | 6/1983 |
| 6,487,499 | B1 | 11/2002 | Fuchs et al. | JP | 7-36035 | 5/1986 |
| 6,505,161 | B1 | 1/2003 | Brems | JP | 4-326079 | 11/1992 |
| 6,510,387 | B2 | 1/2003 | Fuchs et al. | JP | H. 07-107550 | 4/1995 |
| 6,519,466 | B2 | 2/2003 | Pande et al. | JP | 2000-102058 | 4/2000 |
| 6,526,283 | B1 | 2/2003 | Jang | JP | 2001-128226 | 5/2001 |
| 6,526,352 | B1 | 2/2003 | Johnson et al. | JP | 2001-223601 | 8/2001 |
| 6,429,829 | B1 | 3/2003 | Turetzky et al. | JP | 2002-290308 | 1/2002 |
| 6,529,829 | B2 | 3/2003 | Turetzky et al. | JP | 2002-199451 | 7/2002 |
| 6,535,815 | B2 | 3/2003 | Bloebaum | JP | 2003-032140 | 1/2003 |
| 6,542,821 | B2 | 4/2003 | Krasner | JP | 2003-284156 | 10/2003 |
| 6,542,823 | B2 | 4/2003 | Garin et al. | JP | 2004-023753 | 1/2004 |
| 6,546,232 | B1 | 4/2003 | Sack | JP | 2004271310 | 9/2004 |
| 6,559,793 | B1 | 5/2003 | Eschenbach | WO | WO 90/11652 | 10/1990 |
| 6,559,794 | B1 | 5/2003 | Nakajima et al. | WO | 99/47943 | 9/1999 |
| 6,570,530 | B2 | 5/2003 | Gaal et al. | WO | WO 99/47943 | 9/1999 |
| 6,583,734 | B2 | 6/2003 | Bates et al. | WO | WO 00/10031 | 2/2000 |
| 6,583,757 | B2 | 6/2003 | Krasner | WO | WO 00/45191 | 8/2000 |
| 6,597,311 | B2 | 7/2003 | Sheynblat | WO | WO 01/62034 A | 8/2001 |
| 6,633,255 | B2 | 10/2003 | Krasner | WO | 02/004975 | 1/2002 |
| 6,650,694 | B1 | 11/2003 | Brown et al. | WO | WO 02/04975 | 1/2002 |
| 6,671,620 | B1 | 12/2003 | Garin et al. | WO | 02/063782 | 8/2002 |
| 6,677,894 | B2 | 1/2004 | Sheynblat et al. | WO | WO 03/098258 | 11/2003 |
| 6,684,158 | B1 | 1/2004 | Garin et al. | WO | 2004/031794 | 4/2004 |
| 6,707,423 | B2 | 3/2004 | Turetzky et al. | WO | 2004/034082 | 4/2004 |
| 6,720,920 | B2 | 4/2004 | Breed et al. | WO | WO2006014170 | 2/2006 |
| 6,731,238 | B2 | 5/2004 | Johnson | WO | 2007/126401 | 11/2007 |
| 6,738,630 | B2 | 5/2004 | Ashmore | | | |
| 6,748,198 | B1 | 6/2004 | Salo | | OTHER PUBLICATIONS | |
| 6,748,217 | B1 | 6/2004 | Hunzinger et al. | | | |
| 6,771,625 | B1 | 8/2004 | Beal | New Fast GPS Code-Acquisition Using FFT, Electronic Letters, vol. 27, No. 2, pp. 158-160 (1991). | | |
| 6,788,885 | B2 | 8/2004 | Agashe et al. | | | |
| 6,829,534 | B2 | 12/2004 | Fuchs et al. | Novel Fast GPS/GLONASS Code Acquisition Technique Using Low Update Rate FFT, Electronic Letters, vol. 28, No. 9, pp. 863-865 (1992). | | |
| 6,871,061 | B1 | 3/2005 | Koorapaty et al. | | | |
| 6,873,288 | B2 | 3/2005 | Heppe | | | |
| 6,915,208 | B2 | 7/2005 | Garin et al. | | | |

3GPP TS 25.305, 3$^{rd}$Generation Partnership Project; Technical Specification Group Radio Access Network; Stage 2 Functional Specification of User Equipment (UE) Positioning in UTRAN (Release 5), Mar. 2002, pp. 1-2 and 36-44.

Marketing Material: Qualcomm CDMA Technologies—Integrated Solutions—MGP6200™ Multimode GPS Processor (8 pages).

Marketing Material: uNav Microelectronics—uN9x18 Low Power, High Performance GPS Receiver chipset/uN9x18 GPS Receiver Solution (9 pages).

Marketing Material: uNav Microelectronics, uN9x18 Low Power, High Performance Receiver Chipset (2 pages).

Marketing Material: Global Locate—Hammerhead II™, Single Chip AGPS Solution (2 pages).

Marketing Material/Press Release: Broadcom Introduces Advances Single-Chip GPS Solution for Mobile Applications (3 pages).

Marketing Material/White Paper: Snap Track: a Qualcomm Company—Snaptrack's Wireless Assisted GPS™(A-GPS) Solution Provides the Industry's Best Location System—Location Technologies for GSM, GPRS and WCDMA Networks (Qualcomm CDMA Technologies: Enabling the Future of Communications)(4 pages).

* cited by examiner

SYSTEM AND METHOD FOR PROVIDING LOCATION BASED SERVICES OVER A NETWORK

CROSS REFERENCE TO RELATED APPLICATIONS

This application is a continuation-in-part of U.S. patent application Ser. No. 10/885,507, filed Jul. 3, 2004, titled "Aided Location Communication System". U.S. patent application Ser. No. 10/885,507 is a continuation-in-part of PCT application Serial No. PCT/US03/16308, filed May 22, 2003, titled "Search Domain Reducing Frequency Transfer in a Multi-mode Global Positioning System Used With Wireless Networks," which is a continuation-in-part of U.S. patent application Ser. No. 10/155,614, filed May 22, 2002, titled "Search Domain Reducing Frequency Transfer in a Multi-mode Global Positioning System Used With Wireless Networks," now U.S. Pat. No. 6,684,158, which is a continuation-in-part of U.S. patent application Ser. No. 09/795,871, filed Feb. 28, 2001, titled "Information Transfer in a Multi-mode Global Positioning System Used with Wireless Networks," now U.S. Pat. No. 6,427,120, which claims priority under Section 119(e) to U.S. Provisional Application Ser. No. 60/225,076, filed Aug. 14, 2000, all of which are incorporated into this application by reference.

U.S. patent application Ser. No. 10/885,507 is also a continuation-in-part of U.S. patent application Ser. No. 10/385,198, filed Mar. 10, 2003 now U.S. Pat. No. 6,915,208, titled "Information Transfer in a Multi-mode GPS Used with Wireless Networks," which is a continuation of U.S. patent application Ser. No. 10/127,229, filed Apr. 19, 2002, titled "Information Transfer in a Multi-mode GPS Used with Wireless Networks," now U.S. Pat. No. 6,542,823, which is a continuation of U.S. patent application Ser. No. 09/795,871, filed Feb. 28, 2001, titled "Information Transfer in a Multi-mode Global Positioning System Used with Wireless Networks," now U.S. Pat. No. 6,427,120, which claims priority under Section 119(e) to U.S. Provisional Application Ser. No. 60/225,076, filed Aug. 14, 2000, all of which are incorporated into this application by reference.

U.S. patent application Ser. No. 10/885,507 is also a continuation-in-part of U.S. patent application Ser. No. 10/194,627, filed Jul. 12, 2002, titled "Multi-mode GPS For Use with Wireless Networks," which is a continuation of U.S. patent application Ser. No. 10/068,751, filed Feb. 5, 2002, titled "Multi-mode Global Positioning System For Use with Wireless Networks," now U.S. Pat. No. 6,519,466, which is a continuation of U.S. patent application Ser. No. 09/781,068, filed Feb. 8, 2001, titled "Multi-mode Global Positioning System For Use with Wireless Networks," now U.S. Pat. No. 6,389,291, which claims priority under Section 119(e) to U.S. Provisional Application Ser. No. 60/225,076, filed Aug. 14, 2000, all of which are incorporated into this application by reference.

BACKGROUND OF THE INVENTION

1. Field of the Invention

This invention relates generally to the providing of location-based services, including position information of a mobile station (MS) such as a cellular handset. More particularly, the invention relates to the distribution of location-based services over a network, particularly a network utilizing TCP/IP protocols such as the Internet and Web Services.

2. Related Art

Location-based services (LBS) or location-dependent services generally refer to the concept of providing wireless services that are dependent on a certain location, for example, the current position of a mobile station. The mobile station is typically a cellular handset but could also be a personal digital assistant (PDA) or some other type of mobile device, mobile station, or user terminal capable of interfacing with a network. A system providing LBS enables the user of a mobile station, or some other network component or entity (e.g., an application server), to make a request for the position of the mobile station or additionally for a service or application dependent on the position of the mobile station. The request may be a one-time request initiated by the user of the mobile station. For example, a mobile station may request a map showing its current location, driving directions from its current location to a desired destination, information regarding the existence and/or location of a certain type of business (e.g., restaurant, hospital, gas station, etc.) proximate to its current location, and the like. The request may also be triggered at predetermined intervals of time or in response to the occurrence of an event. For example, an application server may request the position of a mobile station in response to the mobile station passing from one geographical area to another area, for tracking or emergency purposes or to provide location-based information such as advertisements or coupons relating to proximate businesses. Hence, once the position of a mobile station is determined, location-based information may be provided to the requesting party. This information may be accessible from databases (which may be owned by content providers and made accessible to subscribers) and provided in a specific format in accordance with a specific application (e.g., maps, travel instructions, business-related content) and filtered in accordance with the position of the requesting party and as well as according to personal preferences set by or for the user and/or according to other predetermined rules. Generally, the position of a mobile station is obtained from a wireless network and/or a suitable positioning service such as a satellite positioning system, and particularly the Global Positioning System (GPS).

GPS (known as GPS NAVSTAR in the US) positioning technology is well-known to persons skilled in the art and thus need not be described in detail herein. Briefly, GPS is based on an existing constellation of twenty-four satellites and five monitoring stations situated around the planet enabling the satellites to broadcast spread-spectrum signals. These GPS signals may be utilized as references in determining the position of a mobile station. In addition to GPS, another positioning technology that may be utilized is the Russian system GLONASS (Global Navigation Satellite System), or the future European system currently known as the Galileo System, which operate in a similar fashion. In GPS, the satellites have 12-hour orbits and are positioned in six orbital planes with nominally four satellites in each plane, equally spaced at sixty degrees apart and inclined at fifty-five degrees relative to the equatorial plane. The satellites transmit carrier signals in two frequencies in the L-band, L1 (1.575.42 MHz) and L2 (1.227.60 MHz). Position is determined by operating a GPS receiver, which may be built into a cellular telephone or other mobile device, to acquire a sufficient number of satellites for pinpointing the location of the GPS receiver. Typically, a minimum of three satellites must be acquired so that their positions relative to the GPS receiver may be trilaterated. However, four satellites are preferred in order to obtain altitude information and ensure that the clock in the GPS receiver is synchronized with the more precise atomic clock in the satellites. Generally, the position of the GPS receiver is computed using the known position of the satellites in space (i.e., the orbits and times are known) and the known distances of the satellites from the GPS receiver (i.e., the travel times of radio signals from the satellites to the GPS receiver may be determined because their velocity at which radio signals propagate is known), and correcting or compensating for any delays and errors such as ephemeris errors. To enable measurement of the distance from a satellite to a GPS receiver, the satellite transmits a Pseudo Random Code (PRC) at precise intervals. The PRC is a stream of bits carrying the timing signal. The PRC also includes the satellite's address and thus each satellite has a unique PRC, enabling a GPS receiver to discriminate among the signals of different satellites. The PRC carried on the L1 carrier frequency, known as the Coarse Acquisition (C/A) code, is designated for civilian use.

Because a GPS receiver does not initially know its position, it must search for satellite signals in order to take the measurements needed to determine its position. From a cold start, the search can take approximately twelve minutes, which is considered much too long for the user of a mobile station. The time to acquire satellite data may be shortened by providing almanac data that essentially describe a long-term model of satellite trajectories, in addition to ephemeris, clock and satellite position data. Almanac data may be provided on a wireless network and updated regularly as new data is received from the satellites. Almanac data enables a GPS receiver to look for specific satellites by letting the GPS receiver know when they are likely to be overhead and visible to the GPS receiver, thereby reducing search time.

In order to improve the performance of GPS-based communications systems, advanced positioning methodologies have been developed. One such methodology is known as assisted-GPS or A-GPS technology, which generally refers to a system in which outside source such as an assistance server and reference network assist a GPS receiver in performing the tasks required for making range measurements, rendering position solutions, and the like. A-GPS promises to be a cost-efficient and time-efficient method for using a wireless network to distribute assistance or aiding data to GPS receivers, particularly GPS receivers integrated in mobile stations such as cellular handsets. Conventional implementations of A-GPS are well-known to persons skilled in the art and thus need not be described in detail herein. Briefly, in an A-GPS implementation, by utilizing the GPS receivers incorporated in a wireless network and estimating the location of a mobile station (e.g., the cell or sector in which the mobile station is located), the GPS signal that the mobile station will receive may be predicted and this information may be transmitted to the mobile station. The use of such assistance greatly reduces the size of the search space and shortens the time-to-first-fix (TTFF) down to a few seconds and potentially one second or less. Moreover, the A-GPS receiver in a mobile station may detect and demodulate signals that are an order of magnitude weaker than those required by conventional GPS receivers. In addition, while a mobile station could be equipped with a chip having all the functionalities of a full A-GPS receiver, only a partial A-GPS receiver is required in an A-GPS enabled mobile station. In the latter case, satellite data is downloaded over the mobile network, and the GPS receiver in the mobile station receives the data needed to calculate position every time the data are needed. In the typical architecture for an A-GPS system envisioned by industry, the system includes a mobile station whose position is sought and that is equipped with a partial GPS receiver, an A-GPS server equipped with a reference GPS receiver that can acquire the same satellites as the mobile station, and a wireless network infrastructure that includes cellular base stations and a mobile switching center.

The A-GPS server obtains the estimated position of the mobile station (e.g., at the level of cell and sector) from the mobile switching center, monitors signals from GPS satellites seen by the mobile station, collects specific measurements from the mobile station, collects position results, and communicates the results to the mobile station.

The advantages provided by A-GPS and other advanced permutations of conventional GPS technology, such as improved accuracy, reduced positioning solution times and lower cost, make these advanced positioning technologies attractive for use in conjunction with location-based services. Ideally, a system capable of providing and distributing location-based services should be able to manage a large number of mobile stations over a large number of geographical areas without requiring the costly build-out of additional network infrastructure and without burdening existing infrastructure. In currently developing approaches for integrating GPS technology with wireless networks, a request for the position of a mobile station initiates the acquisition and refinement of GPS data as well as the generation any assistance or aiding data needed to compute the final position solution for the mobile station. In such a system, it can be appreciated that a large number of positioning requests by multiple users could have the potential for significantly overtaxing the networks involved and consequently defeating the advantages enabled by the positioning technology employed.

Therefore, there is a need for a distributed GPS processing system, and particularly one implementing location-based services, which overcomes the disadvantages set forth above and others previously experienced. In particular, there is a need for a system that distributes only one set of aiding data to all A-GPS users in the same location area without the need for a complex infrastructure for point-to-point and cell broadcasting position methods in as in current A-GPS technology.

SUMMARY

A method is described for providing location-based information over a network. In this method, a plurality of GPS reference data sets, corresponding to a plurality of respective local areas, are acquired at intervals such that each GPS reference data set is updated on a continuous basis. A plurality of aiding data sets are generated at intervals based on the respective GPS data sets, whereby each aiding data set is updated on a continuous basis. The generated aiding data sets are stored at intervals on a data-storing network server, whereby updated aiding data sets are available on a continuous basis for access by a requesting entity via communication with the data-storing network server.

According to another aspect of the subject matter disclosed, a method is described for providing location-based information over a network. In the method, a plurality of GPS reference data sets, corresponding to a plurality of respective local areas, are acquired at intervals such that each GPS reference data set is updated on a continuous basis. A plurality of aiding data sets are generated at intervals based on the respective GPS data sets, whereby each aiding data set is updated on a continuous basis. The generated aiding data sets are stored at intervals on a data-storing network server, whereby updated aiding data sets are available on a continuous basis. In response to a request for the position of a mobile station located in one of the local areas, a stored aiding data set is selected based on the local area in which the mobile station is located, and the selected aiding data set is utilized to compute a final position result indicative of the position of the mobile station.

According to an implementation disclosed, a system is described for providing location-based information over a network. The system may include an A-GPS server, a data-storing network server communicating with the A-GPS server, and an LBS application center communicating with the data-storing network server. The A-GPS server is adapted for generating GPS aiding data sets corresponding to a plurality of local areas and computing a final position result for a mobile station positioned in one of the local areas. The data-storing network server is adapted for receiving the aiding data sets from the A-GPS server and storing the aiding data sets. The LBS application center is adapted for transferring a selected aiding data set to a mobile station and position results from the mobile station to the data-storing network server for use by the A-GPS server in computing the final position result. In some cases, the final position of the mobile station can be computed inside the mobile station and transferred to the LBS application center for direct application without having the A-GPS server to refine the position result.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description, reference is made to the accompanying drawings that form a part hereof, and in which is shown by way of illustration one or more specific exemplary embodiments in which the invention may be practiced. It is to be understood that other embodiments may be utilized and structural changes may be made without departing from the scope of this invention.

The subject matter disclosed according to one aspect provides a system architecture and methodology that extend A-GPS positioning beyond the point-to-point and cell broadcast positioning services currently being employed and developed in the industry. An example of an implementation of the subject matter will now be described with reference to FIGS. 1 and 2, which are schematic representations of a system 100 for providing location-based services (LBS) system over a network such as a TCP/IP network (e.g., the Internet, the World Wide Web, etc.).

Figure 2:
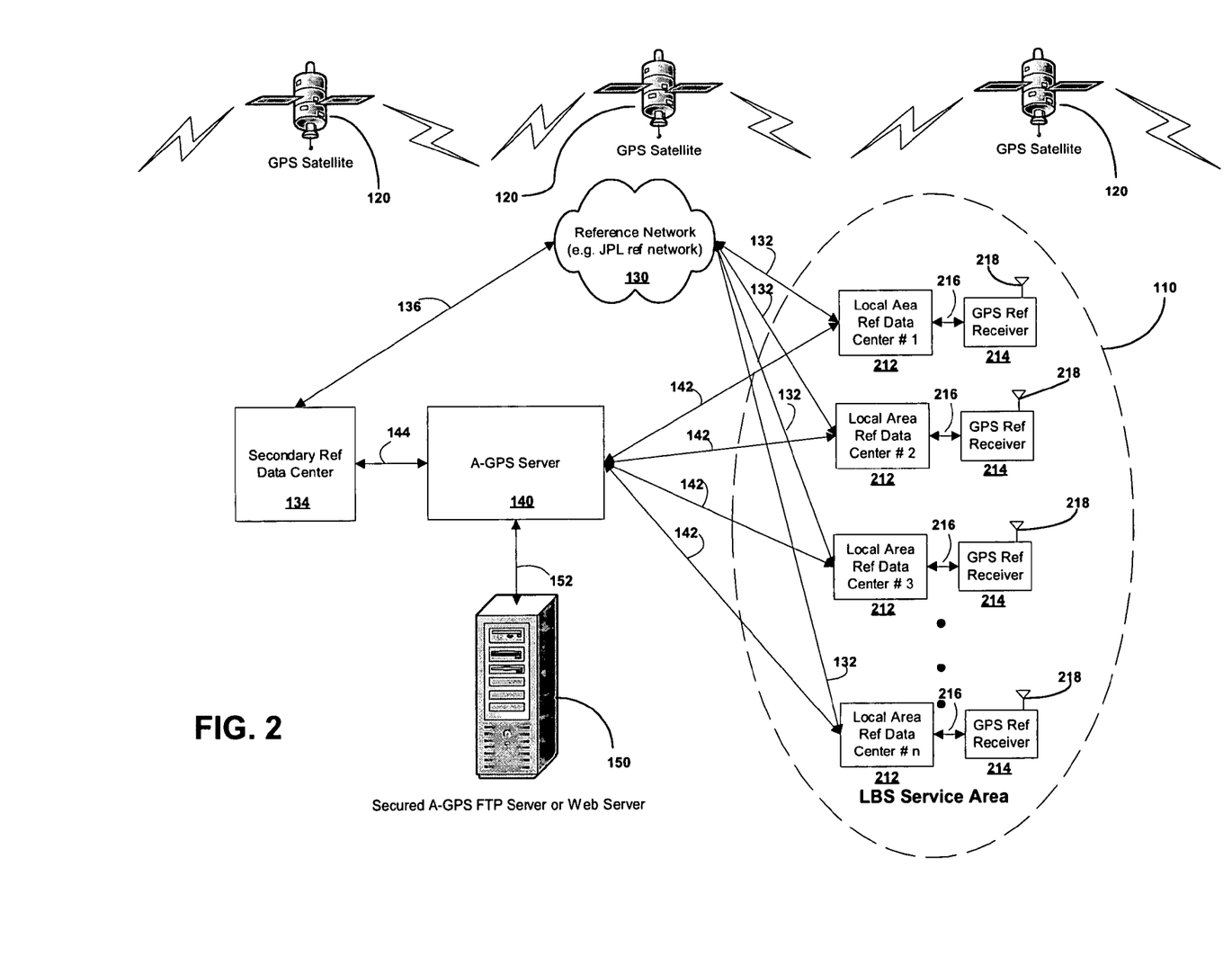
FIG. 2 is a schematic diagram of a portion of the system illustrated in FIG. 1, further illustrating details of the architecture of a location-based services area that forms a part of the network.

System 100 includes one or more location-based services (LBS service) areas 110. An LBS service area 110 may constitute, for example, an area for Enterprise application, a WASP network, a Mobile Virtual Network Operator, or the like. As illustrated in FIG. 2, each LBS service area 110 may include a plurality of local area GPS reference data centers 212. Each local area GPS reference data center 212 communicates with a local GPS reference receiver 214 over an appropriate communication link 216 such as, for example, an RS232 data link. Each local GPS reference receiver 214 utilizes its own GPS antenna 218 to receive GPS data from a plurality of visible GPS satellites 120 via over-the-air transmissions on a continuous basis. For convenience, only three GPS satellites 120 are illustrated, but it will be understood that the illustrated GPS satellites 120 can be part of a larger constellation of GPS satellites. Each local area GPS reference data center 212 collects the GPS data acquired by its corresponding local GPS reference receiver 214. As appreciated by persons skilled in the art, each local area GPS reference data center 212 may include electronic circuitry, computer software, and/or hardware as needed to interface with its corresponding local GPS reference receiver 214 and implement this functionality. The GPS data collected may include, but is not limited to, ephemeris, almanac, GPS time, 50 bits per second nav message, DGPS correction, and other types of GPS data for use in A-GPS positioning. The number of local area GPS reference data centers 212 in a given LBS service area 110 can vary, depending on the particular LBS service area 110 to be covered. Typically, a local area GPS reference data center 212 covers a geographical service area of approximately 30-50 km in general diameter. In other exemplary implementations, the service area may be as large as approximately 300-500 km.

Each local area GPS reference data center 212 may communicate with a global GPS reference network 130 via appropriate data links 132, which may include a TCP/IP ftp site or other reference network. The global GPS reference network 130 may be any network that supports GPS data for global coverage. One example of a suitable global GPS reference network 130 is the existing JPL reference network, although the subject matter is not limited to the use of this network. The global GPS reference network 130 may communicate with a secondary reference data center 134 via an appropriate data link 136, enabling the secondary reference data center 134 to collect GPS data from the global GPS reference network 130. The GPS data collected can include, but is not limited to, ephemeris, almanac, GPS time, bits per second nav message, DGPS correction, and other types of GPS data for use in A-GPS positioning. As further described below, the secondary GPS reference data center 134 may be utilized as a backup system to support the GPS reference data in the event a local area GPS reference data center 212 fails to support GPS data due to hardware failure, software failure, link failure, or the like.

Each local area GPS reference data center 212 may also communicate with an A-GPS server 140 over an appropriate communication link 142 such as a TCP/IP link. The A-GPS server 140 may thus receive local GPS reference data (e.g., ephemeris, almanac, GPS time, bits per second nav message, DGPS correction, and other types of GPS data for use in A-GPS positioning) from the local area GPS reference data centers 212. The A-GPS server 140 may in turn communicate with the secondary reference data center 134 via an appropriate communication link 144 such as a TCP/IP link to receive global GPS reference data (e.g., ephemeris, almanac, GPS time, bits per second nav message, DGPS correction, and other types of GPS data for use in A-GPS positioning). In addition, the A-GPS server 140 may communicate with a data-storing network server 150 such as, for example, a secured Internet server (e.g., an ftp server or web server), via an appropriate communication link 152 such as a TCP/IP link to enable the transfer of data between these two network components as described below. The A-GPS server 140 performs a number of functions. These functions include managing the GPS reference data collected from local area GPS reference data centers 212 and/or the secondary reference data center 134, validating such GPS data, generating and formatting GPS aiding data for storage on the data-storing network server 150, computing the final position of a target A-GPS enabled mobile station 160 based on position results outputted by the mobile station 160, and providing the final position to the data-storing network server 150. Many of these functions are further described below. The data-storing network server 150 manages the storage of a variety of location-based data, including A-GPS data provided by the A-GPS server 140, position results, and the like. In addition, the data-storing network server 150 can be employed to manage the storage of application site information, user information, and the like. Still further, the data-storing network server 150 can be employed to control user access to the data files and keep track of the number of users accessing data, the number of times a particular user has accessed data, billing processes, and so on.

Mobile station 160 may be capable of multiple modes of operation, including non-assisted as well as assisted modes, wherein at least one mode is manually or automatically selectable in which mobile station 160 is A-GPS enabled for compatibility with implementations described in this disclosure. Mobile station 160 may, for instance, take the form of a wireless device such as a cellular telephone (also known as a wireless handset, cellphone, mobile telephone or mobile phone) or any other type of mobile device, including, but not limited to, personal digital assistants ("PDAs"), pagers, computer, two-way radio, trunked radio, specialized mobile radio ("SMR") or any other device for which it is desirable to determine location information. In the case of a cellular telephone, mobile station 160 may utilize a cellular transceiver in its communication section that operates at any radio frequency ("RF") band utilizing any transmission schemes including but not limited to CDMA, CDMA-2000, W-CDMA, TDMA, FDMA, GSM, UMTS, AMPS, Bluetooth, Wi-Fi and/or any combination or extension of these transmission schemes or similar schemes. Mobile station 160 may be an Aided Location Communication Device ("ALCD") as disclosed in copending U.S. patent application Ser. No. 10/885,507, filed Jul. 3, 2004, titled "Aided Location Communication System", assigned to the assignee of this disclosure.

A location-based services (LBS) application center or server 170 communicates with the data-storing network server 150 via an appropriate communication link 172 such as a TCP/IP link to enable the transfer of data between these two network components. The LBS application center 170 is provided to manage communications with a number of network components. The LBS application center 170 communicates with any number of mobile stations 160 participating in a wireless network, including the target mobile station 160 illustrated in FIG. 1, to enable A-GPS data and application data transfer between the LBS application center 170 and the target mobile station 160. The wireless network may be, for example, a cellular telephony network that includes a plurality of cellular base stations 174 as represented by the cellular base station 174 illustrated in FIG. 1. The cellular base station 174 may distribute data to the LBS application center 170 via a suitable interface 176, such as an over-the-air Internet or WAP IP connection. The LBS application center 170 manages the access of A-GPS data stored on the data-storing network server 150 for mobile stations 160. In addition, the LBS application center 170 may communicate with one or more location-based application servers or centers, such as one or more GIS servers 180 and/or other application servers 190, using appropriate communication links 182 and 192, respectively, such as TCP/IP links or other types of Internet connections. The GIS server 180 supports the LBS application center 170 with map data, route information, point-of-interest information, and the like. The application server 190, which can advantageously be a network application server such as an Internet application server, supports the LBS application center 170 with other types of information based on the computed location of a target mobile station 160 for which position data has been requested, such as business-related information, marketing-related information, database information, and the like. Examples of such location-based information can include, but are not limited to, advertisements for businesses or events local to the target mobile station 160, coupons, tickets, catalogs, and the like. As an option, in appropriate circumstances, the LBS application center 170 may grant an application server 190 permission to access location information for the target mobile station 160 directly from the data-storing network server 150 as depicted by the communication link 194 illustrated in FIG. 1.

An example of the operation of the system illustrated in FIGS. 1 and 2 will now be described. As previously indicated, each local area GPS reference data center 212 manages the collection of raw GPS data from GPS satellites 120 visible to the relevant local coverage area. In advantageous implementations, each local area GPS reference data center 212 collects raw GPS data from its corresponding local GPS reference receiver 214 on a continuous basis. In this context, the term "continuous" may mean periodically or at intervals of time (e.g., every 30 seconds). In addition, each local area GPS reference data center 212 obtains the position its local GPS reference receiver 214. In typical implementations, each local GPS reference receiver 214 is situated at its corresponding local area GPS reference data center 212 such that the position of a local GPS reference receiver 214 is also the position of the corresponding local area GPS reference data center 212. Each local area GPS reference data center 212 sends the collected raw GPS data to the A-GPS server 140. In advantageous implementations, each set of raw GPS data is sent to the A-GPS server 140 soon after it is acquired and processed at the local area GPS reference data center 212 as appropriate. That is, each local area GPS reference data center can 212 provide its most recent GPS data to the A-GPS server 140 on a continuous basis (e.g., every 30 seconds). In addition, each local area GPS reference data center 212 provides its position to the A-GPS server 140. In this manner, the A-GPS server 140 can generate updated position aiding data for the mobile stations 160 located within the service areas covered by the respective local area GPS reference data centers 212. In advantageous implementations, the transmission of the local GPS data and position information from the local area GPS reference data center 212 and the updating of these data on a continuous basis is initiated by the A-GPS server 140—i.e., the A-GPS server 140 continuously requests each local area GPS reference data center 212 to provide the latest GPS data from those satellites 120 that are visible to that particular local area GPS reference data center 212.

In the event that a local GPS reference receiver 214 fails to provide GPS data, the corresponding local area GPS reference data center 212 in advantageous embodiments switches the GPS data collection from the local GPS reference receiver 214 to the global GPS reference network 130. The GPS data collected from the global GPS reference network 130 will be filtered out for local visible satellites 120 based on the position of the local area GPS reference data center 212. The secondary GPS reference data center 134 collects the global GPS data from the global GPS reference network 130 and provides the data to the A-GPS server 140 in response to a request by the A-GPS server 140.

The A-GPS server 140 stores the sets or packets of GPS data for each local area in a memory location and processes the data sets to generate sets or packets of aiding data corresponding to each local area. The aiding data are available only for those mobile terminals 160 located within a particular local service area. Aiding data are generated without any request by a requesting entity (such as the mobile station 160) because every mobile station 160 in the same service area can use the aiding data applicable to that service area. The A-GPS server 140 can format the aiding data into any protocol type supported by the industry. Examples of protocols and aiding types include, but are not limited to, those set forth in TABLES 1 and 2 below.

TABLE 1

Aiding Data for Enterprise Application

| Protocol | Aiding Type | Update Rate (typical) |
|---|---|---|
| RRLP | MS-Based | 12 minutes |

TABLE 2

Aiding Data for Commercial Application to Support Multiple A-GPS Client Solutions

| Protocol | Aiding Type | Update Rate (typical) |
|---|---|---|
| RRLP | MS-Based | 12 minutes |
|  | MS-Assisted | Up to 1 hr |
| RRC | MS-Based | 12 minutes |
|  | MS-Assisted | Up to 1 hr |
| IS-801 | MS-Based | 12 minutes |
|  | MS-Assisted | Up to 1 hr |

It will be noted that for mobile station-based (MS-based) aiding types, with the A-GPS data, position is computed inside the mobile station 160 and returns to the A-GPS server 140. For mobile station-assisted (MS-assisted) aiding types, with the A-GPS data, position is computed inside the A-GPS server 140 based on the GPS results returned from the mobile station 160. It will be further noted that a given aiding message can include position aiding data indicative of the position of the local area GPS reference data center 212.

Once the A-GPS server 140 processes a set of aiding data into an aiding protocol message format, the A-GPS server 140 writes the aiding data to the data-storing network server 150. In this manner, updated aiding data for each local area are always obtainable by accessing the data-storing network server 150. Hence, the system 100 does not need to wait for a user-initiated position request in order to compute aiding data, unlike systems of the prior art. It thus can be seen that the architecture and operation of the system 100 offer several advantages. In the event that a request is made for the position of a mobile station 160, existing, current aiding data can be retrieved from the data-storing network server 150 in response to the request—i.e., the request itself is not needed to generate aiding data-thus reducing network latency and time required for create the A-GPS data and improving the time-to-first-fix (TTFF), as well as reducing the network bandwidth required for data transfer. The structure of the aiding data written to the data-storing network server 150 may include, but is not limited to, the structures set forth in TABLES 3 and 4 below.

TABLE 3

Aiding Data Structure for Enterprise Application

| A-GPS Aiding | Service Area 1 | Aiding Data message (aiding data protocol message) |
|---|---|---|
|  | Service Area 2 | Aiding Data message (aiding data protocol message) |
|  | . | . |
|  | . | . |
|  | . | . |
|  | Service Area n | Aiding Data message (aiding data protocol message) |

TABLE 4

Aiding Data Structure for Commercial Application to Support Multiple A-GPS Client Solutions

| A-GPS Aiding | RRLP | Service Area 1 | MS-Based | Aiding Data message (aiding data in RRLP message) |
|---|---|---|---|---|
|  |  |  | MS-Assisted | Aiding Data message (aiding data in RRLP message) |
|  |  | Service Area 2 | MS-Based | Aiding Data message (aiding data in RRC message) |
|  |  |  | MS-Assisted | Aiding Data message (aiding data in RRC message) |
|  |  | . | . | . |
|  |  | . | . | . |
|  |  | . | . | . |
|  |  | Service Area n | MS-Based | Aiding Data message (aiding data in IS-801 message) |
|  |  |  | MS-Assisted | Aiding Data message (aiding data in IS-801 message) |
|  | RRC | Service Area 1 | MS-Based | Aiding Data message (aiding data in RRLP message) |
|  |  |  | MS-Assisted | Aiding Data message (aiding data in RRLP message) |
|  |  | Service Area 2 | MS-Based | Aiding Data message (aiding data in RRC message) |
|  |  |  | MS-Assisted | Aiding Data message (aiding data in RRC message) |
|  |  | . | . | . |
|  |  | . | . | . |
|  |  | . | . | . |
|  |  | Service Area n | MS-Based | Aiding Data message (aiding data in IS-801 message) |
|  |  |  | MS-Assisted | Aiding Data message (aiding data in IS-801 message) |
|  | IS-801 | Service Area 1 | MS-Based | Aiding Data message (aiding data in RRLP message) |
|  |  |  | MS-Assisted | Aiding Data message (aiding data in RRLP message) |
|  |  | Service Area 2 | MS-Based | Aiding Data message (aiding data in RRC message) |
|  |  |  | MS-Assisted | Aiding Data message (aiding data in RRC message) |
|  |  | . | . | . |
|  |  | . | . | . |
|  |  | . | . | . |
|  |  | Service Area n | MS-Based | Aiding Data message (aiding data in IS-801 message) |
|  |  |  | MS-Assisted | Aiding Data message (aiding data in IS-801 message) |

The aiding data generated by the A-GPS server 140 can be utilized to fulfill a request for the position of a target mobile station 160. Such a request can be made by any appropriate requesting entity communicating with the system 100. The requesting entity can be, for example, an application, site, or end user that utilizes the position of a mobile station 160 in order to provide location-based services (e.g., map information, travel directions, tracking, commercial information) or emergency services (e.g., E911 service) to the user of the mobile station 160. The requesting entity can also be the target mobile station 160 itself or another mobile station that seeks the position of the target mobile station 160. For convenience, the remainder of the description of the operation of the exemplary system 100 illustrated in FIGS. 1 and 2 will assume that the requesting entity is the mobile station 160, with the understanding that the system 100 and methods encompassed by this disclosure are not limited to this scenario.

In one exemplary implementation, a positioning request is made to the LBS application center 170. Upon receiving the positioning request, the LBS application center 170 maps the mobile station 160 to a service area based on, for example, the ID of the mobile station 160 (e.g., a cell phone number, a user tag for enterprise applications, etc.) and on the approximate position of the mobile station 160 (e.g., a cell position for commercial applications, etc.). The LBS application center 170 can also determine which aiding protocol is to be used for the mobile station 160 based on the ID of the mobile station 160 and/or other types of information. Once it has determined the appropriate aiding protocol and identified the service area, the LBS application center 170 accesses a service area directory stored on the data-storing network server 150 and retrieves the aiding data pertinent for the area in which the target mobile station 160 is located. The LBS application center 170 passes the aiding data from the data-storing network server 150 to the mobile station 160 as a data packet without decoding and reformatting the data. The LBS application center 170 can also choose to add a service area ID to the aiding message, and the service area ID can be attached to the position result message returned by the mobile station 160. The LBS application center 170 can quickly pass the position result to the appropriate destination in the data-storing network server 150.

Figure 1:
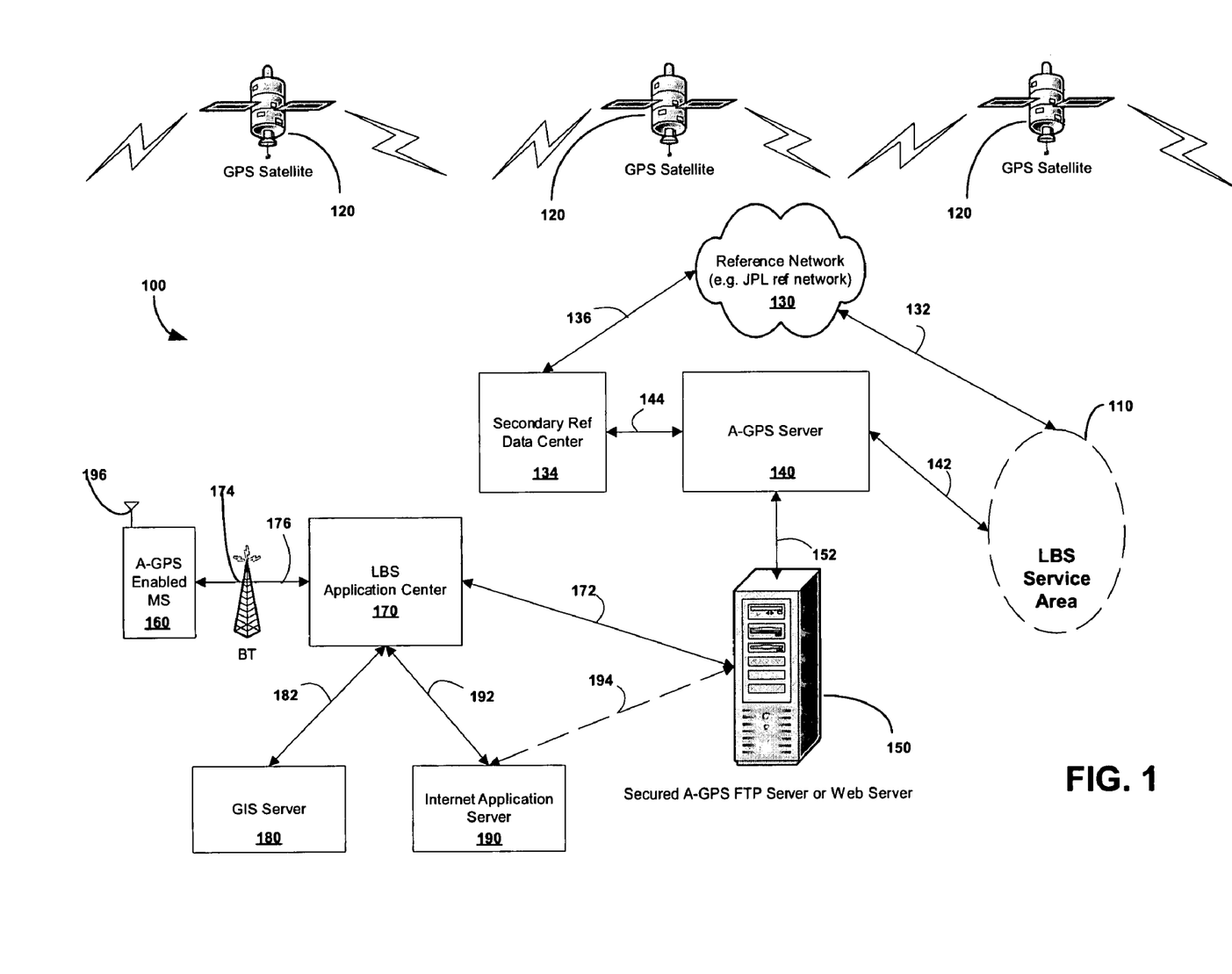
FIG. 1 is a schematic diagram of a system for providing location-based services according to an implementation of this disclosure.

In one exemplary implementation, the mobile station 160 is A-GPS enabled and hence an A-GPS unit is integrated with the mobile station 160 as represented by the GPS antenna 196 illustrated in FIG. 1. Any suitable mobile station 160 can be employed in the system 100. Examples include, but are not limited to, a cell phone, PDA, pager, handheld device, portable computer, or the like. After receiving aiding data, the target mobile station 160 can follow a conventional A-GPS positioning method to decode the aiding data and then pass the aiding data to the A-GPS unit associated with the mobile station 160. The A-GPS unit can follow any conventional A-GPS positioning method to compute the position result (e.g., position in X, Y, Z for MS-based mode; GPS result for MS-assisted mode) using the aiding data. As an alternative to including a built-in A-GPS unit, a mobile station 160 can be provided that is able to connect to a local A-GPS accessory, i.e., an external A-GPS unit, via a wireless or wired data link. In either case, the computed position result for the mobile station 160 is packed in a suitable protocol message and sent to the LBS application center 170 following any conventional method. If the mobile station 160 receives the service area ID in the aiding message, the mobile station 160 can also return the service area ID with the position result.

Once the LBS application center 170 receives the position result from the mobile station 160, the LBS application center 170 determines the service area in which the mobile station 160 resides. The LBS application center 170 then sends the position result message to the data-storing network server 150 on a first-come-first-serve basis. In the exemplary implementation, it will be noted that the LBS application center 170 itself does not need to decode and encode the position result in the protocol message. In addition, the position result is returned in one protocol message format regardless of whether it is MS-based or MS-assisted. The A-GPS server 140 does not need to use the position mode information (MS-based or MS-assisted) to compute the position of the mobile station 160. For commercial applications, the LBS application center 170 may receive a position result in more than one protocol, for example, RRLP, RRC, IS-801, or the like. However, based on the terminal ID, the LBS application center 170 is able to determine what type of protocol is used in the position return message and hence the position result message can be stored in the protocol based directory in the data-storing network server 150.

The data structure of the position result that is written to the data-storing network server 150 can include, but is not limited to, the structures set forth in TABLES 5 and 6 below.

TABLE 5

Position Result Storage Structure for Enterprise Application

| Position Result | Service Area 1 | MS ID 1-1 | Position Result message |
|---|---|---|---|
| | | MS ID 1-2 | Position Result message |
| | | . | . |
| | | . | . |
| | | . | . |
| | | MS ID 1-a | Position Result message |
| | Service Area 2 | MS ID 2-1 | Position Result message |
| | | MS ID 2-2 | Position Result message |
| | | . | . |
| | | . | . |
| | | . | . |
| | | MS ID 2-b | Position Result message |
| | . | | |
| | . | | |
| | . | | |
| | Service Area n | MS ID n-1 | Position Result message |
| | | MS ID n-2 | Position Result message |
| | | . | . |
| | | . | . |
| | | . | . |
| | | MS ID n-c | Position Result message |

TABLE 6

Position Result Storage Structure for Commercial Application to Support Multiple A-GPS Client Solutions

| Position Result | RRLP | Service Area 1 | MS ID a1-1 | Position Result message |
|---|---|---|---|---|
| | | | MS ID a1-2 | Position Result message |
| | | | . | . |
| | | | . | . |
| | | | . | . |
| | | | MS ID a1-a | Position Result message |
| | | Service Area 2 | MS ID a2-1 | Position Result message |
| | | | MS ID a2-2 | Position Result message |
| | | | . | . |
| | | | . | . |
| | | | . | . |
| | | | MS ID a2-b | Position Result message |
| | | . | . | . |
| | | . | . | . |
| | | . | . | . |

TABLE 6-continued

Position Result Storage Structure for Commercial Application to Support Multiple A-GPS Client Solutions

|  |  |  | MS ID a3-1 | Position Result message |
|---|---|---|---|---|
|  |  | Service Area n | MS ID a3-2 | Position Result message |
|  |  |  | . | . |
|  |  |  | . | . |
|  |  |  | . | . |
|  |  |  | MS ID a3-c | Position Result message |
|  | RRC | Service Area 1 | MS ID a2-1 | Position Result message |
|  |  |  | MS ID a2-2 | Position Result message |
|  |  |  | . | . |
|  |  |  | . | . |
|  |  |  | . | . |
|  |  |  | MS ID a2-a | Position Result message |
|  |  | Service Area 2 | MS ID b2-1 | Position Result message |
|  |  |  | MS ID b2-2 | Position Result message |
|  |  |  | . | . |
|  |  |  | . | . |
|  |  |  | . | . |
|  |  |  | MS ID b2-b | Position Result message |
|  |  | . | . | . |
|  |  | . | . | . |
|  |  | . | . | . |
|  |  | Service Area n | MS ID c2-1 | Position Result message |
|  |  |  | MS ID c2-2 | Position Result message |
|  |  |  | . | . |
|  |  |  | . | . |
|  |  |  | . | . |
|  |  |  | MS ID c2-c | Position Result message |
| IS-801 | RRLP |  | MS ID ax-1 | Position Result message |
|  |  |  | MS ID ax-2 | Position Result message |
|  |  |  | . | . |
|  |  |  | . | . |
|  |  |  | . | . |
|  |  |  | MS ID 2x-a | Position Result message |
|  | RRC |  | MS ID bx-1 | Position Result message |
|  |  |  | MS ID bx-2 | Position Result message |
|  |  |  | . | . |
|  |  |  | . | . |
|  |  |  | . | . |
|  |  |  | MS ID bx-b | Position Result message |
|  | . | . | . |  |
|  | . | . | . |  |
|  | . | . | . |  |
|  | IS-801 |  | MS ID cx-1 | Position Result message |
|  |  |  | MS ID cx-2 | Position Result message |
|  |  |  | . | . |
|  |  |  | . | . |
|  |  |  | . | . |
|  |  |  | MS ID cx-c | Position Result message |

In one exemplary implementation, the A-GPS server 140 continuously scans the position result directory in the data-storing network server 150 for new position result messages. For any such position result data, the A-GPS server 140 computes the final position result for the mobile station 160 using the navigation engine operating in the A-GPS server 140. The final position result can include, but is not limited to, the following parameters: position in longitude, latitude, altitude, position error, time of the position, speed, heading info, and the like. Upon computing a final position result, the A-GPS server 140 transmits the final position result to the data-storing network server 150, where this set of data is stored in an appropriate directory in the data-storing network server 150. Once stored in the data-storing network server 150, the final position data can be accessed by an appropriate network component for use in providing final position information, and/or applications or services based on the final position information, to a requesting entity (e.g., a mobile station, application, site, end user, or the like). A non-limiting example of the directory structure in the data-storing network server 150 is set forth in TABLE 7 below.

TABLE 7

Final Position Result Structure

| Service Area 1 | MS ID 1 | Final MS Position Result message |
|---|---|---|
|  | MS ID 2 | Final MS Position Result message |
|  | . | . |
|  | . | . |
|  | . | . |
|  | MS ID x | Final MS Position Result message |
| Service Area 2 | MS ID 1 | Final MS Position Result message |
|  | MS ID 2 | Final MS Position Result message |
|  | . | . |
|  | . | . |
|  | . | . |
|  | MS ID y | Final MS Position Result message |
| . | . | . |
| . | . | . |
| . | . | . |
| Service Area n | MS ID 1 | Final MS Position Result message |
|  | MS ID 2 | Final MS Position Result message |
|  | . | . |
|  | . | . |
|  | . | . |
|  | MS ID z | Final MS Position Result message |

In one exemplary implementation, the LBS application center 170 retrieves the final position information from the data-storing network server 150. The LBS application center 170 can use the final position information as well as the ID of the target mobile station 160 (e.g., cellular telephone number) to generate location-based applications or services for the target mobile station 160, such as by interfacing with the GIS server 180 to obtain street maps, points of interest, street route information, and the like, and/or interfacing with the application server 190 of a content or service provider to generate content (e.g., advertisements, coupons, tickets, local business, traffic or weather information, etc.) pertinent to the determined location of the target mobile station 160. It can be appreciated by persons skilled in the art that once the final position and ID of the target mobile station 160 are made available at the LBS application center 170, a wide variety of different types of location services and content applications can be developed for presentation to the requesting entity.

Figure 3:
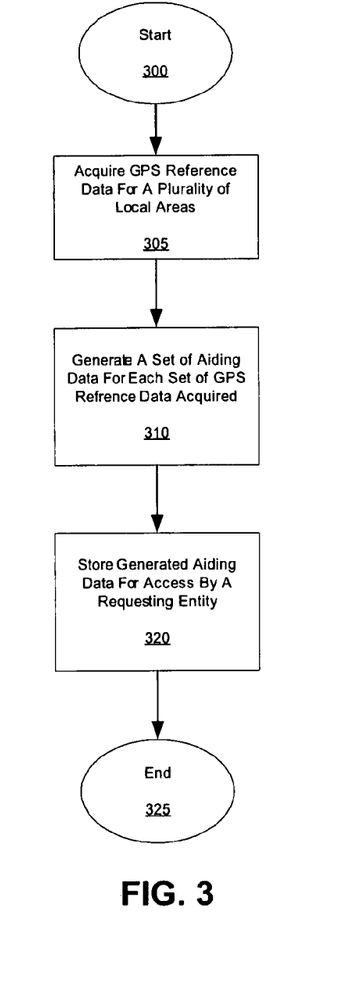
FIG. 3 is a flow diagram illustrating a method for providing location-based information over a network according to an implementation of this disclosure.

Referring now to FIG. 3, one example of a method for providing location-based information over a network is illustrated. The method starts at block 300, and at block 305, GPS reference data are acquired. The data may be characterized as being in sets or packets, with each set or packet of data corresponding to an area (e.g., a cell, sector, sub-sector, beam, or the like). At block 310, for each set of GPS reference data acquired, a corresponding set of aiding data are generated. At block 320, the sets of aiding data so generated are stored at a location and in a manner that enables the data to be accessed by a position requesting entity. The method then ends in block 325.

For example, as described above, the aiding data may be stored on a data-storing network server 150. Hence, the aiding data is available at the time the position request is made, i.e., the actions summarized in blocks 300, 310, and 320 does not need to be initiated in response to the position request. As described above, it is advantageous that the actions summarized in blocks 300, 310, and 320 be repeated at regular intervals so that the aiding data being made available for access are updated for any given locality in which a mobile station 160 whose position is sought is located.

The foregoing system 100 and its operation may provide a number of advantages over prior art approaches to creating and distributing location-based information over a network or networks. For example, complex infrastructures conventionally required for A-GPS data transfer across a network are eliminated. Network latency and time needed to create A-GPS data, and network bandwidth required for data transfer, are reduced. The time-to-first-fix is shortened. LBS solutions for enterprise and commercial applications are easily scalable. Moreover, the system 100 provides an economical and easy way to generate location-based revenues for content providers. The system 100 facilitates the tracking of A-GPS transactions via history of access to the data-storing network server 150 and thus facilitates billing processes.

It will be understood, and is appreciated by persons skilled in the art, that one or more processes, sub-processes, or process steps described in connection with FIGS. 1 and 2 may be performed by hardware and/or software. If the process is performed by software, the software may reside in software memory (not shown) in the variable modulation unicast system. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While the foregoing description refers to the use of a GPS-based communications system, the subject matter is not limited to such a system. Any positioning technology that could benefit from the functionality provided by network components described above, such as the data-storing network server 150 and the LBS application center 170, could be implemented in the system 100.

Moreover, it will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for providing location-based information over a network, the method comprising:
   acquiring a plurality of GPS reference data sets at intervals, the plurality of GPS reference data sets corresponding to a plurality of respective local areas, whereby each GPS reference data set is updated on a continuous basis;
   generating a plurality of aiding data sets usable by assisted GPS clients for obtaining a GPS positioning solution at intervals based on the respective GPS data sets, whereby each aiding data set is updated on a continuous basis;
   storing the generated aiding data sets at intervals on a data-storing network server, whereby updated aiding data sets are available on a continuous basis for access by a requesting entity via communication with the data-storing network server;
   receiving a request for a position of a mobile station from the requesting entity and, in response to the request, selecting an aiding data set from the plurality of generated aiding data sets based on the area in which the mobile station is located;
   computing a first position result based on the selected aiding data set and storing the first position result on the data-storing network server; and
   computing a final position result based on the previously computed first position result and storing the final position result on the data-storing network server.

2. The method according to claim 1 wherein acquiring comprises retrieving GPS data from a plurality of local GPS reference data centers serving respective local areas.

3. The method according to claim 2 wherein the plurality of local GPS reference data centers communicate with respective local GPS reference receivers adapted for acquiring GPS signals from one or more GPS satellites.

4. The method according to claim 2 wherein retrieving comprises operating an A-GPS server to request GPS data from each of the local GPS reference data centers.

5. The method according to claim 1 wherein generating comprises operating an A-GPS server.

6. The method according to claim 5 comprising sending a generated aiding data set from the A-GPS server to the data-storing network server.

7. The method according to claim 1 wherein the data-storing network server comprises a web server.

8. The method according to claim 1 wherein the data-storing network server comprises an ftp server.

9. The method according to claim 1 comprising sending the selected aiding data set from the data-storing network server to the mobile station.

10. The method according to claim 1 wherein the requesting entity comprises the mobile station.

11. The method according to claim 1 wherein the requesting entity comprises an application server.

12. The method according to claim 1 wherein selecting comprises operating a location-based services application center communicating with the mobile station and with the data-storing network server.

13. The method according to claim 1 wherein computing the first position result comprises operating an A-GPS unit integrated with the mobile station.

14. The method according to claim 1 wherein computing the first position result comprises operating an external GPS unit communicating with the mobile station.

15. The method according to claim 1 wherein computing the final position result comprises operating an A-GPS server communicating with the data-storing network server.

16. The method according to claim 1 comprising continuously scanning the data-storing network server for new position results stored thereon, computing final position results corresponding to each new position result found, and storing the final position results on the data-storing network server.

17. The method according to claim 16 wherein scanning comprises operating an A-GPS server communicating with the data-storing network server.

18. The method according to claim 1 comprising generating location-based service information based on the computed final position result and sending the location-based service information to the requesting entity.

19. The method according to claim 18 wherein the requesting entity comprises the mobile station.

20. The method according to claim 18 wherein the requesting entity comprises an application server.

21. The method according to claim 18 wherein generating location-based services information comprises retrieving location-based services data from a database and generating a location-based services application based on the computed final position result.

22. The method according to claim 21 wherein retrieving location-based services data comprises accessing a location-based services application server.

23. The method according to claim 22 wherein the location-based services application server comprises a GIS server.

24. The method according to claim 22 wherein the location-based services application server comprises an Internet application server.

25. A system for providing location-based information over a network, the system comprising:
   an A-GPS server for generating GPS aiding data sets usable by assisted GPS clients for obtaining a GPS positioning solution corresponding to a plurality of local areas, whereby each GPS aiding data set is updated on a continuous basis, the A-GPS server being adapted to, in response to a request from a mobile station, select an aiding data set from the plurality of generated GPS aiding data sets based on the area in which the mobile station is located, the A-GPS server further being adapted to compute a final position result for the mobile station;
   a data-storing network server communicating with the A-GPS server for receiving the aiding data sets from the A-GPS server and storing the aiding data sets; and
   an LBS application center communicating with the data-storing network server for transferring the selected aiding data set to a mobile station and initial position results computed based on the selected aiding data set from the mobile station for storing on the data-storing network server, the initial position results being used by the A-GPS server in computing the final position result, the A-GPS server further being adapted to store the final position result on the data-storing network server.

26. The system according to claim 25, wherein generating the plurality of aiding data sets includes, for each respective local area, filtering global GPS data according to satellites visible at a position corresponding to the respective local area, such that each of the aiding data sets includes only GPS data for its respective local area.

27. The system according to claim 25, wherein the GPS aiding data sets are generated from reference data sets that include one or more of ephemeris, almanac, GPS time and bits per second nav message for one or more GPS satellites that are visible in the respective local areas.

28. The system according to claim 25 wherein the A-GPS server communicates with a plurality of GPS reference data centers disposed in respective local areas.

29. The system according to claim 25 wherein the data-storing network server comprises a web server.

30. The system according to claim 25 wherein the data-storing network server comprises an ftp server.

31. The system according to claim 25 wherein the LBS application center communicates with a wireless network serving a plurality of mobile stations.

32. The system according to claim 25 wherein the LBS application center communicates with a network application server.

33. The method according to claim 1, wherein the reference data sets include one or more of ephemeris, almanac, GPS time and bits per second nav message for one or more GPS satellites that are visible in the respective local areas.

34. The method according to claim 1, wherein generating the plurality of aiding data sets includes, for each respective local area, filtering global GPS data according to satellites visible at a position corresponding to the respective local area, such that each of the aiding data sets includes only GPS data for its respective local area.

* * * * *

UNITED STATES PATENT AND TRADEMARK OFFICE
CERTIFICATE OF CORRECTION

PATENT NO. : 8,078,189 B2
APPLICATION NO. : 11/089455
DATED : December 13, 2011
INVENTOR(S) : Chang et al.

It is certified that error appears in the above-identified patent and that said Letters Patent is hereby corrected as shown below:

On the Title Page

Item (52), under "U.S. Cl." Lines 1-2,
delete "372/357.2; 372/357.22; 372/358;" and
insert -- 342/357.2; 342/357.22; 342/358; --, therefor.

On Page 3, delete Page Number "3" and insert -- 2 --, therefor.

On Page 4, delete Page Number "4" and insert -- 3 --, therefor.

On Page 4, Item (56), under "U.S. PATENT DOCUMENTS", Line 33,
below "6,429,815" insert -- 6429829 3/2003 Turetzky et al. --.

On Page 4, Item (56), under "FOREIGN PATENT DOCUMENTS", Line 5, delete
"EP 1452886 9/2004".

On Page 4, Item (56), under "FOREIGN PATENT DOCUMENTS", Line 22, delete
"WO 99/47943 9/1999".

On Page 4, Item (56), under "FOREIGN PATENT DOCUMENTS", Line 27, delete
"WO 02/004975 1/2002".

On Page 5, delete Page Numbering "Page 5" and insert -- Page 4 --, therefor.

In Column 17, Line 31, in Claim 25, delete "anA-GPS" and insert -- an A-GPS --, therefor.

Signed and Sealed this
Twenty-sixth Day of March, 2013

Teresa Stanek Rea
*Acting Director of the United States Patent and Trademark Office*